(12) United States Patent
Vincent (10) Patent No.: US 11,054,033 B2
(45) Date of Patent: Jul. 6, 2021

(54) SEA WATER SEAL WITHOUT OIL LUBRICATION FOR PODS

(71) Applicant: GE Energy Power Conversion Technology Limited, Rugby (GB)

(72) Inventor: Loic Vincent, Belfort (FR)

(73) Assignee: GE Energy Power Conversion Technology Limited, Warwickshire (GB)

(*) Notice: Subject to any disclaimer, the term of this patent is extended or adjusted under 35 U.S.C. 154(b) by 225 days.

(21) Appl. No.: 16/010,823

(22) Filed: Jun. 18, 2018

(65) Prior Publication Data
US 2019/0011050 A1    Jan. 10, 2019

(30) Foreign Application Priority Data
Jul. 5, 2017   (FR) ...................................... 1756327

(51) Int. Cl.
| F16J 15/00 | (2006.01) |
| F16J 15/3232 | (2016.01) |
| F16J 15/40 | (2006.01) |
| B63H 23/32 | (2006.01) |
| F16J 15/3296 | (2016.01) |

(52) U.S. Cl.
CPC .......... F16J 15/004 (2013.01); B63H 23/321 (2013.01); F16J 15/002 (2013.01); F16J 15/006 (2013.01); F16J 15/3232 (2013.01); F16J 15/3296 (2013.01); F16J 15/40 (2013.01); *B63H 2023/327* (2013.01); *Y10S 277/926* (2013.01)

(58) Field of Classification Search
CPC .. B63H 2023/327; F16J 15/002; F16J 15/004; F16J 15/006; F16J 15/3232; F16J 15/40; Y10S 277/926
See application file for complete search history.

(56) References Cited

U.S. PATENT DOCUMENTS

| 3,934,952 A | 1/1976 | Gardner | |
| 4,395,141 A * | 7/1983 | Pietsch | ................ B63H 23/321 |
| | | | 277/432 |

(Continued)

FOREIGN PATENT DOCUMENTS

| GB | 2096554 A | 10/1982 |
| WO | 2011062484 A2 | 5/2011 |

OTHER PUBLICATIONS

Search Report & Written Opinion issued in connection with corresponding FR Application No. 1756327 dated May 17, 2018.

(Continued)

*Primary Examiner* — Nicholas L Foster
(74) *Attorney, Agent, or Firm* — Wood IP LLC (57) ABSTRACT

Sealing device for a propeller shaft of a marine vehicle propulsion unit including a plurality of sealing lips axially offset relative to each other, with a receiving space for a hydraulic fluid delimited by two adjacent sealing lips, at least one buffer space axially offset with respect to the receiving space and delimited by two adjacent sealing lips, whereby the sealing device includes suitable feeding means for supplying the buffer space with a buffer fluid. The device includes a sampling circuit able to sample fluid included in the buffer space and a monitoring device able to check parameters of the fluid sampled by the sampling circuit.

13 Claims, 3 Drawing Sheets

(56) References Cited

U.S. PATENT DOCUMENTS

| | | | | |
|---|---|---|---|---|
| 4,984,811 | A | * | 1/1991 | Kuwahara .............. B63H 23/36 |
| | | | | 277/563 |
| 5,643,026 | A | * | 7/1997 | Pietsch ................ B63H 23/321 |
| | | | | 277/320 |
| 5,683,278 | A | | 11/1997 | Pietsch et al. |
| 6,481,720 | B1 | * | 11/2002 | Yoshida ............... B63H 23/321 |
| | | | | 277/400 |
| 6,514,108 | B2 | * | 2/2003 | von Bergen ......... B63H 23/321 |
| | | | | 440/112 |
| 9,937,991 | B2 | * | 4/2018 | Fangauf ............... B63H 23/321 |
| 10,065,724 | B2 | * | 9/2018 | De Kruijf ............ B63H 23/321 |
| 2013/0300065 | A1 | | 11/2013 | Palokangas |
| 2015/0076768 | A1 | * | 3/2015 | De Kruijf ............ B63H 23/321 |
| | | | | 277/300 |
| 2017/0259898 | A1 | * | 9/2017 | Fangauf ............... B63H 23/321 |
| 2017/0305521 | A1 | * | 10/2017 | Julliand ................. B63H 21/38 |

OTHER PUBLICATIONS

Extended European Search Report and Opinion issued in connection with corresponding EP Application No. 18179943.8 dated Nov. 16, 2018.

* cited by examiner

SEA WATER SEAL WITHOUT OIL LUBRICATION FOR PODS

TECHNOLOGY FIELD

Embodiments of the invention relate to the field of annular seals, and more particularly seals intended to seal a propeller shaft of a marine vehicle propulsion unit, when such a propulsion unit is immersed in seawater.

BACKGROUND OF THE INVENTION

Reference can be made to EP0831026, which describes an example of a marine vehicle propulsion unit, also known as a nacelle propeller. Another term is "propulsion-oriented drive" or "POD" for short.

A propulsion unit as described in this document consists of a propulsion shaft rotatably mounted relative to and within a movable housing, which is itself mechanically connected to a hull element of the marine vehicle. The movable housing has the shape of a nacelle suspended from the hull element of the marine vehicle. The movable housing is normally surrounded by seawater.

To ensure the rotary connection between the propeller shaft and the movable housing, rotary bearings of shafts can be provided inside the movable housing and surrounding the propeller shaft. The propeller shaft can be rotated by a mechanism for transmitting a movement generated by a motor located inside the hull element. Alternatively, the propeller shaft can be driven by a motor such as an electrical machine mounted within the movable housing and radially surrounding the propeller shaft.

The propeller shaft consists of a driven end also known as a "drive end", on which a propulsion element is mounted. The drive end is located outside the movable housing. The movable housing thus consists of a through hole within which the propeller shaft extends. A rotary shaft bearing may be provided substantially in the vicinity of this through hole.

To guarantee a good seal of the movable housing with respect to the seawater, a seal is provided in this orifice. Furthermore, additional seals may be provided to delimit a space for receiving a hydraulic fluid for lubricating the rotary shaft bearing located near the through hole. Such additional seals, as well as the seawater seal, surround the drive end of the propeller shaft so as to provide a sliding contact seal.

However, this solution has certain disadvantages.

Indeed, it happens that the seawater seal is subject to significant wear such that it cannot ensure sufficient sealing. As the propulsion unit is most often immersed, it is difficult to control the wear on this seal and thus prevent the appearance of seawater leaks inside the movable housing. These leaks are such that they damage the various systems located inside the movable housing, such as electronic sensors. These leaks are all the more undesirable when the propeller shaft is driven by an electrical machine located inside the movable housing.

Furthermore, the additional seals also present a risk of leaks of the lubricating hydraulic fluid toward the inside of the movable housing. In addition to the loss of hydraulic fluid, these leaks have the effect of damaging the internal environment of the movable housing and damaging the components located inside the movable housing. In addition, leaks of lubricating hydraulic fluid toward the outside of the movable housing may also appear. This results in pollution of the seawater.

BRIEF DESCRIPTION

In view of the foregoing, the object of the invention is to propose a propeller shaft sealing device for a marine vehicle propulsion unit that overcomes the above-mentioned disadvantages.

More particularly, embodiments of the invention aim to implement a rotary seal against the hydraulic fluid and seawater at the through hole of the housing to achieve a satisfactory level of sealing, while maintaining a relatively simple design and allowing easy control of the proper functionality of the sealing device.

For this purpose, a propeller shaft sealing device for a marine vehicle propulsion unit is proposed, consisting of a plurality of sealing lips axially offset relative to each other, with a space for receiving a hydraulic fluid delimited by two adjacent sealing lips, at least one buffer space axially offset with respect to the receiving space and delimited by two adjacent sealing lips, whereby the sealing device consists of suitable feeding means for supplying said buffer space with a buffer fluid.

According to one of these general characteristics, this sealing device consists of a sampling circuit able to sample fluid contained in said buffer space and a monitoring device able to check parameters of the fluid sampled by the sampling circuit.

Thanks to the combined use of a buffer space and a monitoring device, such a sealing device makes it possible to control the operating state of the device while improving the seal. This results in better general reliability of the propulsion unit and reduced maintenance costs of the propulsion unit.

In one embodiment, the feeding means consist of a buffer fluid tank which is pressurized.

According to another embodiment, the feeding means consist of a buffer fluid circulation circuit consisting of a thermosyphon.

In an embodiment, the buffer fluid consists of at least 90% fresh water.

In an embodiment, the buffer fluid consists of an icing inhibitor and/or a corrosion-inhibiting additive.

The icing inhibitor may consist of glycol, which has the advantage of not being toxic to the environment.

In an embodiment, the buffer fluid is a liquid selected so as to have a solidification temperature below −2° C.

In one embodiment, the buffer fluid is a liquid consisting of a predetermined initial mass fraction of salt, and the monitoring device consists of means for measuring the salt mass fraction of the fluid sampled by the sampling circuit, to calculate a deviation between the measured mass fraction and initial mass fraction and to compare said deviation with a predetermined warning deviation.

It is also possible to provide, axially arranged in this order, a first sealing lip, a second sealing lip, a third sealing lip and a fourth sealing lip, whereby the first lip and the second lip delimit the receiving space, the second lip and the third lip delimit a first buffer space, and the third lip and the fourth lip delimit a second buffer space.

In an embodiment, the first buffer space is intended to be filled with air, the sampling circuit is connected to the first buffer space, the monitoring device consisting of means for measuring the quantity of liquid sampled by the sampling circuit and for comparing the measured quantity with a predetermined warning quantity.

It is also possible to provide a fifth sealing lip axially offset with respect to the fourth lip, whereby the fourth lip and the fifth lip delimit a third buffer space, the feeding means is able to supply the second buffer space and the third buffer space with the same buffer fluid, and the sampling circuit is connected to at least one of the second and third buffer spaces.

In such a specific embodiment, it is also possible to provide a maintenance seal axially offset with respect to the fifth sealing lip, whereby the fifth sealing lip and the maintenance seal delimit an intermediate space.

As an alternative to such an embodiment, it is possible to provide a maintenance joint axially offset with respect to the fourth sealing lip, whereby the fourth sealing lip and the maintenance seal delimit an intermediate space. The maintenance seal is located on the side axially opposite to the first, second and third sealing lips with respect to said fourth sealing lip.

According to another aspect, a method is provided for checking the seal of a device as defined above, in which said buffer space is supplied with a buffer fluid, fluid is sampled from said buffer space and parameters of the fluid are monitored.

BRIEF DESCRIPTION OF THE DRAWINGS

Other objects, characteristics and advantages embodiments of the invention will become apparent on reading the following description, given solely by way of nonlimiting example, with reference to the accompanying drawings, in which.

DETAILED DESCRIPTION

Figure 1:
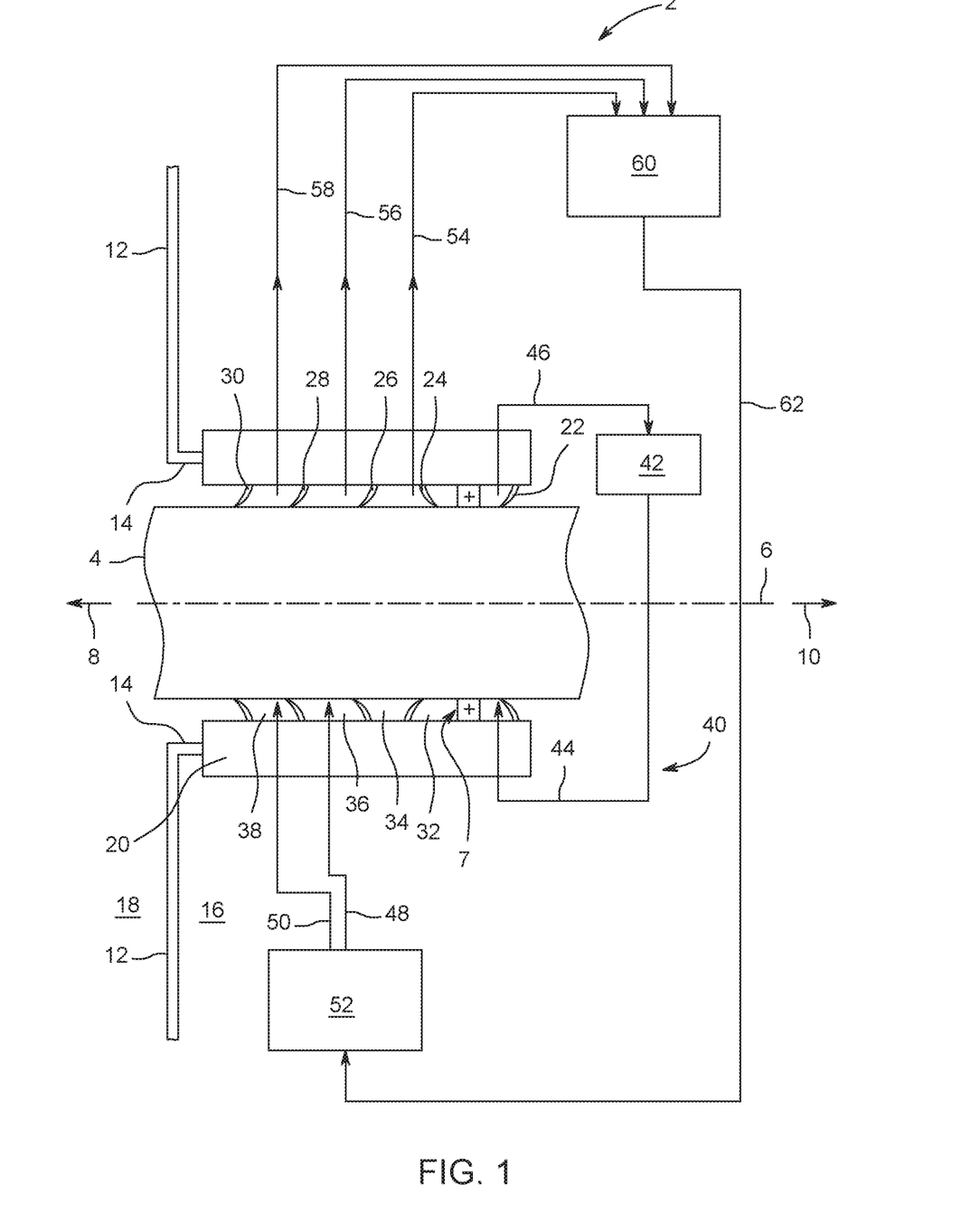
FIG. 1 schematically represents a sealing device according to a first embodiment.

With reference to FIG. 1, it shows a sealing device 2 for a propulsion unit (not shown) intended to be incorporated into a marine vehicle such as a ship, a submarine or an oil platform. The sealing device is, however, not limited to such use, it being understood that it can be incorporated around a rotary-mounted shaft in other systems, for example in a system for producing electrical energy at sea, such as a marine turbine.

The propulsion unit consists of a movable housing 12, shown schematically in FIG. 1, inside which a propeller shaft 4 extends. The shaft 4 is rotary-mounted about its longitudinal axis 6, with respect to the movable housing 12. Throughout this application, the words "axial" and "radial" must be understood as referring to the longitudinal direction 6 of the propeller shaft 4. The movable housing 12 includes an inner space 16 and an outer space 18, the outer space 18 corresponding to seawater when the marine vehicle operates normally at sea.

The shaft 4 has a drive end and a non-drive end (not shown). The drive end is located in the direction of the arrow 8, while the non-drive end is located in the direction of the arrow 10. At its drive end, the shaft 4 consists of a propulsion element (not shown), which may for example be a propeller or a pump rotor. The propulsion element and the drive end are located in the outer space 18 of the movable housing 12. The movable housing 12 has a through hole 14 through which the propeller shaft 4 extends. The part of the shaft 4 located between the sealing device 2 and the drive end is located in the outer space 18 of the movable housing 12. The complementary part, located between the non-drive end and the sealing device 2, is located in the inner space 16 of the movable housing 12. In this way, the sealing device 2 guarantees the seal between the inner space 16 and the outer space 18 at the through hole 14 of the drive end of the propeller shaft 4.

In the embodiment shown, the shaft 4 is rotated relative to the movable housing 12 by means of an electrical machine (not shown) located between the sealing device 2 and the non-drive end. The shaft 4 is further rotated relative to the housing 12 by means of a rotary bearing 7 mounted on the shaft 4 and extending radially around the shaft 4 in the direction of the hole 14 of the movable housing 12. The bearing 7 can be of the sliding type, for example provided with bushed bearings, or of the rolling type, for example a roller bearing or a ball bearing. Another rotary bearing (not shown) is further provided in the inner space 16 of the movable housing 12, in the vicinity of the non-drive end, to provide satisfactory rotation guidance for the shaft 4. The electrical machine consists of a stator (not shown) mounted on the movable housing 12 and a rotor (not shown) mounted on the shaft 4, whereby the stator and the rotor are axially located between the rotary bearing 7 and the non-drive end, and more particularly between the rotary bearing 7 and the other rotary bearing (not shown).

The sealing device 2 consists of a support 20 of hollow cylindrical shape that extends substantially in the direction of the axis 6. The support 20 is integral with the movable housing 12 and is located in the hole 14.

The sealing device 2, axially offset in this order when looking from the non-drive end toward the drive end of the shaft 4, consists of a first sealing lip 22, a second sealing lip 24, a third sealing lip 26, a fourth sealing lip 28 and a fifth sealing lip 30. Sealing lips 22, 24, 26, 28 and 30 are fixed to the inner surface of the support 20. In other words, sealing lips 22 to 30 follow one another along the hole 14 from the inner space 16 toward the outer space 18 of the movable housing 12. With regard to FIG. 1, sealing lips 22 to 30 follow each other in this order from right to left. In addition, sealing lips 22 and 24 are arranged axially on each side of the rotary bearing 7. Sealing lips 26, 28 and 30 extend axially, like sealing lip 24, between the rotary bearing 7 and the drive end.

As shown in FIG. 1, the first sealing lip 22 is axially directed toward the outer space 18, such that its wall adjacent to the inner space 16 is in contact with the shaft 4. Conversely, sealing lip 24 is axially directed toward the inner space 16, such that its wall adjacent to the outer space 18 is in contact with the shaft 4. As for sealing lip 22, sealing lips 26, 28 and 30 are axially directed toward the outer space 18, such that their wall adjacent to the inner space 16 is in contact with the shaft 4.

Sealing lips 22 to 30 may be made of any type of material that allows a good seal resistant to salt water to be obtained. In the example shown, sealing lips 22 to 30 are made of a material consisting mainly of polyurethane.

The first sealing lip 22 and the second sealing lip 24 delimit a receiving space 32. The receiving space 32 is intended to receive a hydraulic fluid for the lubrication of the rotary bearing 7. In the example shown, the hydraulic fluid is oil, but it can be considered, without departing from embodiments of the invention, that the hydraulic fluid is grease, fresh water or any fluid having lubricating properties.

The device 2 consists of a circulation loop 40 capable of continuously supplying the receiving space 32 with hydraulic fluid. The circulation loop 40 consists of a tank 42 of hydraulic fluid. A feeding circuit 44 connects the tank 42 to the receiving space 32. A drainage circuit 46 connects the receiving space 32 to the tank 42. At least one of the circuits 44 and 46 consists of means of circulating the hydraulic fluid through the feeding circuit 44, from the tank 42 to the receiving space 32, and through the drainage circuit 46, from the space 32 to the tank 42.

The second sealing lip 24 and the third sealing lip 26 delimit axially a first buffer space 34 intended to be filled with a first buffer fluid. The third sealing lip 26 and the fourth sealing lip 28 delimit axially a second buffer space 36 intended to be filled with a second buffer fluid. The fourth sealing lip 28 and the fifth sealing lip 30 delimit axially a third buffer space 38 to be filled with a third buffer fluid.

In the example shown, the first buffer fluid is air, while the second buffer fluid and the third buffer fluid are a liquid of the same chemical composition. Thus, in the following description, the characteristics relating to the second buffer fluid also apply to the third buffer fluid. However, within the scope of embodiments of the invention, it is possible to use second and third buffer fluids having different chemical compositions. More particularly, the second buffer fluid consists mainly of water and includes an icing inhibitor and a corrosion-inhibiting additive.

In an embodiment, the second buffer fluid consists of an icing inhibitor consisting of glycol. The use of an icing inhibitor further improves the overall reliability of the sealing device 2, in particular when the marine vehicle is operating in very cold water.

To allow the second buffer fluid to supply the buffer spaces 36 and 38, the sealing device 2 consists of feeding means of the second buffer fluid. The feeding means consist of feeding pipes 48, 50 shown schematically in FIG. 1, and a tank 52 containing the second buffer fluid. The pipes 48, 50 fluidically connect the tank 52 to the second and third buffer spaces 36, 38 respectively.

The sealing device 2 consists of a fluid sampling circuit contained in the buffer spaces 34, 36 and 38. The purpose of the sampling circuit is to sample fluid contained in at least one of the buffer spaces, said fluid consisting of the buffer fluid corresponding to the buffer space in question as well as other fluids, for example fluids having entered the buffer space in question due to a leak in one of the sealing lips. For this purpose, the sampling circuit is connected to said at least one buffer space. In this case, the sampling circuit consists of a first drainage pipe 54 fluidically connected with the first buffer space 34, a second drainage pipe 56 fluidically connected with the second buffer space 36 and a third drainage pipe 58 fluidically connected with the third buffer space 38.

The drainage pipes 54, 56 and 58 are fluidically connected with a monitoring device 60 whose function is to control the parameters of the fluids sampled by the sampling circuit.

The device 2 further consists of a recycling pipe 62 fluidically connecting the monitoring device 60 with the tank 52. The function of the recycling pipe 62 is to convey a part of the fluid sampled by the sampling circuit and analyzed by the monitoring device 60 to the tank 52 for reinjection into the buffer spaces.

Figure 2:
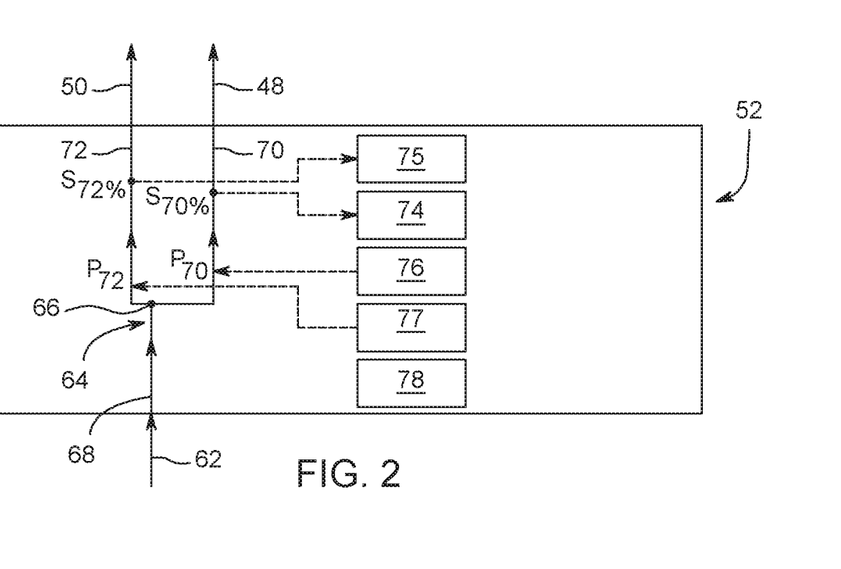
FIG. 2 shows feeding means for the sealing device of FIG. 1.

With reference now to FIG. 2, the second hydraulic fluid tank 52 includes an assembly of conduits 64 for conveying the flow from the recycling pipe 62 to the feeding pipes 48 and 50. The assembly 64 consists of a confluence point 66 and an upstream conduit 68 that fluidically connects the arrival of the recycling pipe 62 to the confluence point 66. The assembly 64 consists of a first downstream conduit 70 and a second downstream conduit 72. Each of the downstream conduits 70, 72 fluidically connects the confluence point 66 with the feeding pipes 48, 50 respectively. A three-way valve (not shown) can be mounted on the confluence point 66. The conduits 68, 70 and 72 are one-way conduits and may, for this purpose, each consist of a non-return valve (not shown).

The tank 52 consists of a first salinity sensor 74 and a second salinity sensor 75. Each of the sensors 74, 75 is respectively capable of measuring the salt mass fraction $S_{70}$, $S_{72}$ of the fluid flowing in the conduit 70, 72.

The tank 52 contains a first pressurization system 76 and a second pressurization system 77. Each of the systems 76, 77 is respectively capable of modifying the pressure $P_{70}$, $P_{72}$ of the fluid circulating in the conduits 70, 72. For this purpose, the systems 76 and 77 may, for example, contain hardware and software means for manipulating the three-way valve located at the confluence point 66.

In the example shown, the systems 76 and 77 are configured to obtain the following relationship:

$$P_0 P_{72} > P_{70}$$

In this way, the pressure of the buffer fluid contained in the second buffer space 36 is lower than the pressure of the buffer fluid contained in the third buffer space 38, and the latter pressure is lower than the seawater pressure. This results in an increase in the pressure of sealing lips 28 and 30 on the shaft 4, and therefore a better seal and a decrease in buffer fluid leaks.

In the exemplary embodiment shown, the air contained in the first buffer space 34 is not renewed and is present at atmospheric pressure. However, without departing from the scope of embodiments of the invention, it is possible to consider that the feeding means contain means for feeding air into the first buffer space 34. Thus, for example, the feeding means may contain an air feeding pipe (not shown) similar to the pipes 48, 50 and fluidically connected to an air tank. It can then be further provided that the air tank contains a pressurization system for the air feeding pipe. In this case, it is then possible to manipulate the pressure of the air contained in the first buffer space 34, in relation to the pressures $P_{70}$ and $P_{72}$, so as to obtain the desired seal by avoiding pressing the sealing lips against the shaft 4 excessively.

In the example shown, the tank 52 is located below the shaft 4 relative to the marine vehicle, and the tank 52 contains a thermosyphon system 78. The function of the system 78 is to circulate the buffer fluid in the loop consisting of the pipes 48, 50, the buffer spaces 36, 38, and the pipes 56, 58. To do this, the thermosyphon system may contain a heat exchanger (not shown) for recovering ambient heat from the inner space 16 of the movable housing 12 to supply it to the buffer fluid contained in the tank 52, in the buffer spaces 36 and 38 and in the conduit 68. The thermosyphon system does not necessarily consist of a single component provided in the tank 52, but may contain a plurality of components distributed in the tank 52, in the pipes 48, 50 and 62, and in the spaces 50, for example walls made of a heat-conducting material. For example, the heat can come from the friction caused inside the bearing 7 or inside the sealing lips 22, 24, 26, 28 and 30 of the device 2. Under the effect of heat, the buffer fluid contained in the tank 52 is driven upward and follows the pipes 48 and 50 to reach the spaces 36 and 38. The buffer fluid continues to increase in temperature and is thus again pulled upward toward the monitoring device 60 via the pipes 56 and 58. The buffer fluid leaving the monitoring device 60 is relatively cold compared to the buffer fluid present in the tank 52 and in the buffer spaces 36 and 38. This results in a flow of buffer fluid leaving the monitoring device 60 through the pipe 62 to reach the tank 52. Such an embodiment is particularly advantageous in that it makes it possible to implement the circulation of buffer fluid between the buffer spaces 36 and 38 without having to incorporate a relatively bulky circulation pump with regard to the volume of the inner space of the housing of the propulsion unit.

Of course, it is not beyond the scope of embodiments of the invention to consider a thermosyphon system having a different design. For example, the system 78 may alternatively consist of a heating means capable of supplying heat to the fluid circulating in the conduit 68. The heat supplied causes a displacement of the heated fluid upward, i.e. in the direction of the buffer spaces 36 and 38, and then the monitoring device 60 via the pipes 56, 58. The fluid then cools, which facilitates its return, via the recycling pipe 62, to the tank 52. We can also consider a variant in which we add to the sampling circuit a sampling element, such as a circulation pump, which actuates the displacement of the buffer fluid in the sampling circuit. In such a variant, the circulation of the buffer fluid is not implemented passively, as was the case with the thermosyphon system 78, but rather actively.

Figure 3:
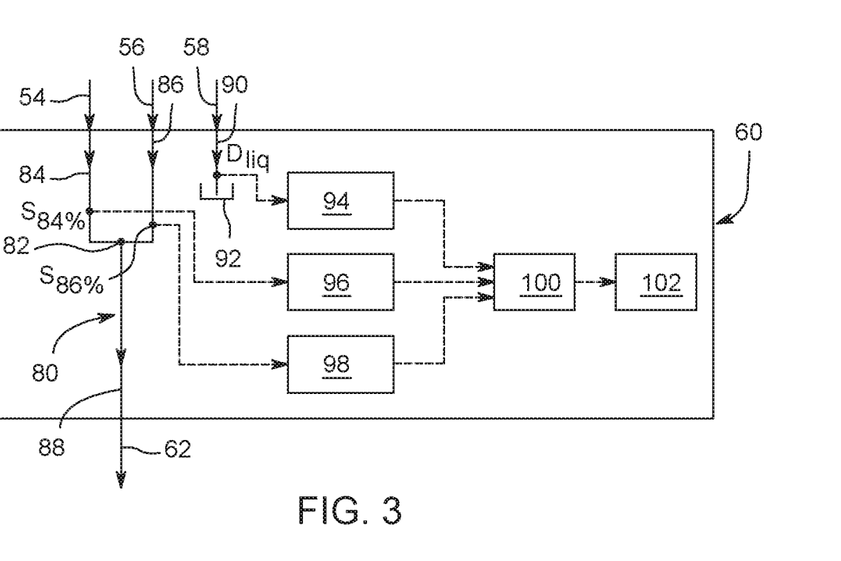
FIG. 3 shows a device for monitoring the sealing device of FIG. 1, and FIG. 4 schematically shows a sealing device according to a second exemplary embodiment.

With reference now to FIG. 3, the monitoring device 60 contains an assembly 80 of conduits for conveying the flow coming from the drainage pipes 56, 58 toward the recycling pipe 62. To do this, the assembly 80 contains a confluence point 82 and two upstream conduits 84, 86, fluidically connecting the pipes 56, 58 respectively with the confluence point 82. The assembly 80 contains a downstream conduit 88 fluidically connecting the confluence point 82 with the recycling pipe 62. The assembly 80 further contains an additional conduit 90 fluidically connecting the drainage pipe 54 to a tank 92. The conduits 86, 88 and 90 are one-way conduits and may, for this purpose, each consist of a non-return valve or flap (not shown).

As shown in FIG. 3, the device 60 directs the buffer fluid flows from the buffer spaces 36 and 38 toward the recycling pipe 62 and the buffer fluid flow from the buffer space 34 toward an independent tank 92. In this way, the buffer fluid from the buffer spaces 36 and 38 is prevented from being mixed with hydraulic fluid from the receiving space 32 which may have leaked into the buffer space 34 due to a failure of the sealing lip 24.

The monitoring device 60 contains a sensor 94 able to measure a quantity of liquid contained in the fluid circulating in the conduit 90. More particularly, the sensor 94 is a flowmeter capable of measuring the flow $D_{liq}$ of liquid coming from the pipe 54 per unit of time. The sensor 94 compares the measured value $D_{liq}$ with a stored reference value of the liquid flow $D_{REF}$. More particularly, a reference value $D_{REF}$ is selected of between 2 L/month and 4 L/month, and even more a reference value $D_{REF}$ of +/−20% around 3 L/month.

The device 60 contains a first sensor 96 of the salt mass fraction $S_{84}$ of the fluid circulating in the first upstream conduit 84. The sensor 96 calculates a first salinity deviation:

$$\Delta_{84} = S_{84} - S_{70}$$

The sensor 96 compares the value $\Delta_{84}$ calculated with a stored reference deviation $\Delta_{84REF}$. More particularly, a reference deviation $\Delta_{84REF}$ of between 10 g/L and 20 g/L will be selected, and even more a reference deviation $\Delta_{84REF}$ of +/−20% around 15 g/L.

The device 60 contains a second sensor 98 of the salt mass fraction $S_{86}$ of the fluid circulating in the second downstream conduit 86. The sensor 98 calculates a second salinity deviation:

$$\Delta_{86} = S_{86} - S_{72}$$

The sensor 98 compares the measured value $\Delta_{86}$ with a stored reference deviation $\Delta_{86REF}$. More particularly, a reference deviation $\Delta_{86REF}$ of between 10 g/L and 20 g/L will be selected, and even more a reference deviation $\Delta_{86REF}$ of +/−20% around 15 g/L.

The monitoring device 60 further contains a calculator 100 having the function of compiling the results of the comparisons measured by the measuring means 94, 96 and 98. In the example shown, as soon as the value $D_{liq}$, $\Delta_{84}$ or $\Delta_{86}$ determined by one of the sensors 94, 96 or 98 exceeds the associated reference value $D_{REF}$, $\Delta_{84REF}$ or $\Delta_{86REF}$, the calculator 100 emits a warning signal. More particularly, the calculator 100 emits a minimum-level warning signal when the measured value $\Delta_{84}$ exceeds the reference value $D_{REF}$, an intermediate-level warning signal when the value $\Delta_{84}$ exceeds the reference value $\Delta_{84REF}$, and a maximum-level warning signal when the value $\Delta_{86}$ exceeds the reference value $\Delta_{86REF}$.

The monitoring device 60 includes a control interface 102 capable of collecting the warning signal when it is transmitted by the calculator 100. The interface 102 may consist of a display screen, an indicator light or any other type of visual and/or auditory device capable of attracting the attention of an operator. The interface 102 may, for example, be located in a navigational bridge of the marine vehicle. When the calculator 100 emits a warning signal, it is collected by the interface 102 which displays a warning message intended to warn an operator of an insufficient seal level of the sealing device 2.

Thus, when a leak appears in a lip delimiting a receiving space or buffer, the monitoring device 60 is able to detect the appearance of this leak.

More particularly, when a leak appears in the sealing lip 24, hydraulic fluid from the receiving space from the receiving space 32 appears in the air contained in the first buffer space 34, which is collected by the drainage pipe 54 and circulates via the conduit 90 to the tank 92. The sensor 94 detects an increase in the liquid flow rate $D_{liq}$ circulating in the conduit 90 above the reference flow rate $D_{REF}$ and a minimum-level warning signal is emitted.

When a leak appears on sealing lip 26, the buffer fluid contained in the second buffer space 36 is mixed with the air contained in the first buffer space 34 and flows in the same way via the conduit 90. The sensor 94 also detects an increase in the liquid flow $D_{liq}$ above the reference flow $D_{REF}$ and a minimum-level warning signal is emitted.

In the exemplary embodiment shown, the sensor 94 is a flowmeter capable of measuring the flow of liquid. However, without departing from the scope of embodiments of the invention, we can consider a sensor having a different design, capable of separately measuring a flow of hydraulic fluid and a water flow. Such a sensor makes it possible to identify which of the sealing lips 24 and 26 is faulty when an abnormal quantity of liquid circulates in the conduit 90.

When a leak appears in sealing lip 30, seawater from the outer space 18 enters the third buffer space 38 and is mixed with the buffer fluid contained in it. The fluid formed from this buffer fluid and this seawater is collected by the drainage pipe 58 and circulates via the conduit 86. The sensor 98 detects an increase in the salt content of the liquid circulating in the conduit 86. An intermediate-level warning signal is then issued.

When a leak occurs in both sealing lip 30 and sealing lip 28, seawater from the outer space 18 passes through the third buffer space 38 and enters the second buffer space 36. The fluid formed from this seawater and the buffer fluid contained in this buffer space 36 is collected by the drainage pipe 56 and circulates via the conduit 84. The sensor 96 detects an increase in the salt content of the liquid circulating in the conduit 84. A maximum-level warning signal is then issued.

Thus, thanks to its configuration with at least one buffer space, a sampling circuit and a monitoring device, sealing device 2 makes it possible to guarantee the seal around the hole 14 for passage of the driven end of the shaft 4 optimally while controlling the sealing status and, in particular, the wear on the sealing lips.

In particular, the buffer spaces supplied by a buffer fluid feeding unit containing a system for pressurizing the buffer fluid make it possible to ensure improved sealing and find a good compromise between tightness and the wear on the sealing lips.

The use of several juxtaposed buffer spaces makes it possible to obtain maximum sealing and thus minimize the risk of leaks of seawater and/or hydraulic fluid.

The use of a plurality of buffer spaces and a calculator capable of emitting different warning signals of various criticalities makes it possible to effectively warn an operator about the status of wear on the sealing lips. In particular, the sealing device 2 emits a minimum-level warning signal when the seal defects are such as to cause hydraulic fluid losses toward the tank 92, an intermediate-level warning signal when the seal defects generate a limited risk of penetration of seawater into the inner space 16 of the movable housing 12 and an absolute level warning signal when the seal defects generate a high risk of flooding of the inner space 16.

Thus, by using three buffer spaces axially offset with respect to each other and located between the hydraulic fluid receiving space and the outer space of the movable housing, in combination with a device for monitoring the properties of the buffer fluid, a better overall seal is ensured and the operating status of the sealing device is controlled more precisely.

Figure 4:
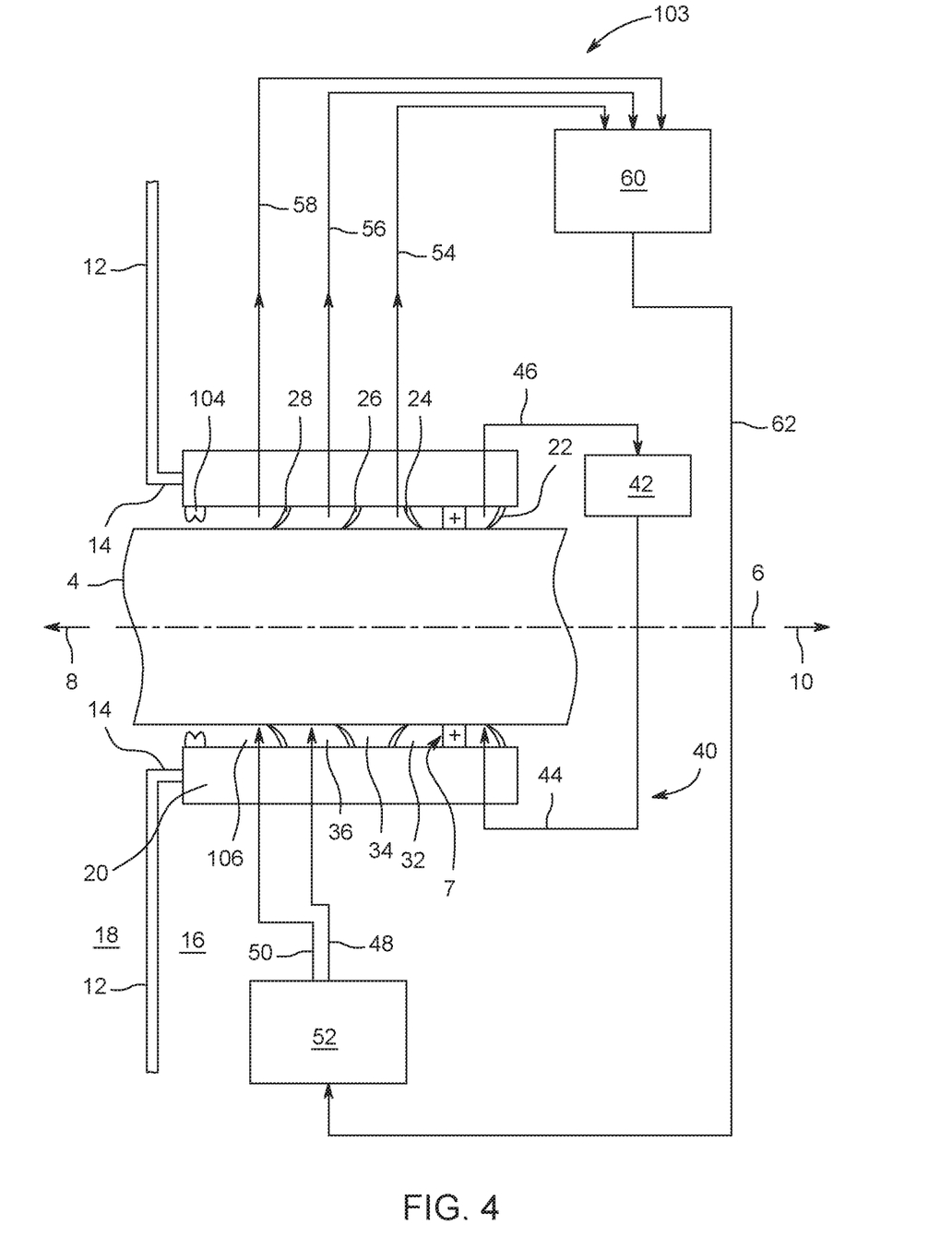

FIG. 4 shows a second exemplary embodiment of a sealing device 103 according to embodiments of the invention. Identical items carry the same references.

The sealing device 103 differs from the sealing device 2, in particular, in that the sealing lip 30 is replaced by a maintenance joint 104. In this case, the maintenance joint 104 is an inflatable joint. The joint 104 is intended to be inflated when a maintenance of the sealing device 103 or the rotary bearing 7 is performed. For this purpose, the joint 104 is designed to create a static seal when inflated. The sealing lip 28 and the joint 104 delimit axially an intermediate space 106. The sealing device 103 also differs from the sealing device 2 in that it does not have any pipe connecting the intermediate space 106 to the monitoring device 60 or the tank 52. As a result, the intermediate space 106 is not intended to be filled with a buffer fluid, and no fluid is collected from said intermediate space 106.

Such an exemplary embodiment has greater compactness and reduced complexity, while facilitating maintenance operations.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A sealing device for a propeller shaft of a marine vehicle propulsion unit, comprising:
   a set of sealing lips being (i) located within a movable housing; (ii) axially offset relative to one another and (iii) arranged for contact with a surface along a length of the propeller shaft, the set of sealing lips including, in an order from an inner space of the movable housing toward a space outside of the movable housing, a first sealing lip, a second sealing lip, a third sealing lip, a fourth sealing lip, and a fifth sealing lip;
   wherein the first sealing lip, the third sealing lip, the fourth sealing lip, and the fifth sealing lip of the set of sealing lips are axially angled toward a space outside of the movable housing, and the second sealing lip of the set of sealing lips is axially angled toward an inner space of the movable housing;
   a receiving space for a hydraulic fluid, the receiving space being defined between the first sealing lip and the second sealing lip of the set of sealing lips;
   at least one buffer space being axially offset with respect to the receiving space and defined between two adjacent sealing lips of the set of sealing lips other than the first sealing lip and the second sealing lip;
   a feeding device configured to supply the at least one buffer space with a buffer fluid;
   a sampling circuit configured to sample buffer fluid contained in the at least one buffer space; and
   a monitoring device fluidically connected to the at least one buffer space and configured to check parameters of the buffer fluid sampled by the sampling circuit contained in the at least one buffer space.

2. The sealing device according to claim 1, wherein the feeding device contains a pressurized tank for the buffer fluid.

3. The sealing device according to claim 1, wherein the feeding device contains a buffer fluid circulation circuit, the circulation circuit comprising a thermosyphon.

4. The sealing device according to claim 1, wherein the buffer fluid contains at least 95% fresh water.

5. The sealing device according to claim 1, wherein the buffer fluid further comprises an icing inhibitor.

6. The sealing device according to claim 1, wherein the buffer fluid is a liquid selected to have a solidification temperature below −2° C.

7. The sealing device according to claim 1, wherein the buffer fluid is a liquid comprising a predetermined initial salt mass fraction, and wherein the monitoring device is configured for measuring the salt mass fraction of the fluid sampled by the sampling circuit to calculate a deviation between the measured fraction and the initial fraction and to compare the deviation with a predetermined warning deviation.

8. The sealing device according to claim 1, wherein the second sealing lip and the third sealing lip delimit a first buffer space of the at least one buffer space, and the third sealing lip and the fourth sealing lip delimit a second buffer space of the at least one buffer space.

9. The sealing device according to claim 8, wherein the first buffer space is intended to be filled with air and the monitoring device is configured for measuring a quantity of buffer fluid sampled by the sampling circuit and for comparing a measured quantity with a predetermined warning quantity.

10. The sealing device according to claim 8, wherein the fifth sealing lip is axially offset with respect to the fourth sealing lip, and wherein the fourth sealing lip and the fifth sealing lip delimit a third buffer space of the at least one buffer, the feeding device being able to supply the second buffer space and the third buffer space with the same buffer fluid.

11. The sealing device according to claim 8, further comprising a maintenance joint axially offset with respect to the fourth sealing lip, wherein the fourth sealing lip and the maintenance joint delimit an intermediate space.

12. A method for checking the sealing device according to claim 1, wherein the at least one buffer space is supplied with the buffer fluid, the fluid is sampled from the buffer space, and the parameters of the sampled fluid are monitored.

13. The sealing device according to claim 1, wherein the buffer fluid further comprises a corrosion-inhibiting additive.

* * * * *